Patented Sept. 7, 1948

2,448,680

UNITED STATES PATENT OFFICE 2,448,680

METHOD OF PRODUCING CORN STEEP NUTRIENT

Robert P. Myers and Marvin L. Speck, Baltimore, Md., assignors, by mesne assignments, to National Dairy Research Laboratories, Inc., New York, N. Y., a corporation of Delaware No Drawing. Application October 5, 1944, Serial No. 557,378

9 Claims. (Cl. 195—103)

This invention relates to nutrients for microorganisms such as bacteria, yeast, and molds and to the preparation of such nutrients. More particularly, the invention relates to nutrients derived from corn or corn steep water that are useful in the propagation of many types of microorganisms, and to the preparation of such nutrients.

It has been recognized, heretofore, that crude corn steep water is a valuable and highly effective nutrient for propagating cultures of microorganisms and for increasing the yields of penicillin, vinegar, lactic acid and many other compositions that are produced by the action of such microorganisms.

The disadvantages of corn steep water, either in its dilute or concentrated form, are that it contains components, such as carbohydrates and insoluble and coagulable materials which interfere with the uses to which the product is put. In bacteriological culture media which are used for fermentation studies the basal nutrient medium must be free of fermentable carbohydrates. The nutrient material described herewith supplies accessory factors needed in such media. Insoluble and heat coagulable materials normally present in corn steep water interfere in bacteriological culture media which must be clear and free from precipitates in order that the growth of the particular microorganisms being studied may be readily observed. These insoluble and coagulable materials also interfere in such industrial operations as penicillin manufacturing, vinegar production, lactic acid production. etc., in that they complicate the purification of the particular chemical being produced. In the case of vinegar production the accumulation of insoluble materials in the vinegar generators would soon foul the shavings and interfere with the functioning of the generators.

Inasmuch as the disadvantages of the insoluble and coagulable material outweigh the nutrient value of these components, it would be desirable to remove them as completely as possible, while retaining only the water soluble components of the corn steep water having nutrient value.

An object of the present invention, accordingly, is to provide a nutrient that contains the water soluble nutrient components of corn steep water and is substantially free of unwanted components.

Another object of the invention is to provide a method of freeing corn steep water from unwanted coagulable components and carbohydrates.

A further object of the invention is to provide a concentrated nutrient that contains the valuable water-soluble nutrient materials present in the corn steep water, and is free from coagulable components and carbohydrates.

Other objects of the invention will become apparent from the following description of typical methods and products embodying the present invention.

In accordance with the present invention, corn steep water is fermented to eliminate the carbohydrates, subsequently is treated to precipitate and separate the unwanted coagulable materials, and then is concentrated.

More particularly, corn steep water is concentrated to increase its total solids content and is fermented with a suitable fermenting organism which is capable of converting fermentable sugars into more desirable components. When the corn steep water includes dextrines among the carbohydrates, it may be desirable to acid-hydrolyze the corn steep water, after concentration, in order to convert the dextrines into fermentable sugars in the known way. A satisfactory method of accomplishing this is to add concentrated hydrochloric acid to the corn steep water to give pH 1.0 or slightly lower and heat for about one hour at about 20 pounds pressure. This heating period and temperature can be varied considerably, for example by heating for a longer period of time at lower pressure or a shorter period of time at higher pressure.

After fermentation of the corn steep water to eliminate substantially all of the carbohydrates, it is rendered strongly alkaline by the addition of a suitable alkaline reagent, such as sodium or potassium hydroxide, sodium carbonate or the like. Preferably, the pH value of the corn steep water is adjusted to between 8.5 and 9.5, although higher pH values may be used as desired. Lower pH values than 8.5 are not completely effective for the purposes to be described, whereas higher pH values than 9.5 are effective, but require additional amounts of reagents without improvement in the results obtained.

When the corn steep water has been rendered alkaline, the coagulable materials may be precipitated by heating the solution to about the boiling point of water or above. For example, substantially complete precipitation of the coagulable components can be obtained by heating the alkaline solution to between 190° and 212° F. for about two hours or longer. The coagulable components also can be precipitated in a shorter period of time when higher temperatures are used. For example, the coagulable components are precipitated by heating the alkaline solution in an autoclave for a period of about 20 to 30 minutes at a temperature equivalent to the temperature of steam at a pressure of about 15 pounds per square inch. This more drastic treatment, however, results in the production of a darker colored product than that obtained with the milder heat treatment referred to above.

After precipitation of the coagulable components of the corn steep water, the mixture may be cooled and clarified by centrifugal separation, or filtration, with or without a suitable filter aid.

The filtrate or liquid component obtained by separation of the precipitated solids is then substantially neutralized by the addition of a suitable acid such as, for example, hydrochloric acid. Preferably the mixture is adjusted to a pH value between about 6.8 and 7.2.

The mixture is then in a condition suitable for drying to a paste-like or powdered condition. The mixture can be dried in a conventional spray drying apparatus, a vacuum tray, or on a vacuum roll drier. Inasmuch as the powdered product is very hygroscopic, a thick paste is preferable when it is properly packaged in an air-tight container.

By way of specific example of the process, corn steep water, which is obtained by steeping corn in water for a period of from 24 to 36 hours, is concentrated to approximately 10% total solids content. The extent of concentration is not critical and, therefore, it may be conducted to any degree found satisfactory.

Compressed yeast is added to the concentrated steep water in the proportions of about 1 pound of compressed yeast for each 100 pounds of the partially concentrated corn steep water. The proportions of yeast and corn steep water can be varied considerably, inasmuch as the function of the yeast is to ferment the carbohydrates or fermentable sugars present in the steep water, and therefore is dependent upon the amount of sugar present in the steep water. The temperature of the mixture is maintained between about 80 and 90° F. and the mixture is aerated vigorously for about 4 or 5 hours or until such time as a negative test for sugar is obtained.

Instead of adding yeast, other suitable microorganisms may be employed to ferment the carbohydrate materials present. Among various types of microorganisms that may be used for this purpose are members of the genera Lactobacillus and Clostridium. When microorganisms of this type are employed, aeration, which is normally used with the yeast fermentation, is omitted.

At the completion of the fermentation operation, sodium hydroxide is added to the mixture to increase the pH value of the mixture to between about 8.5 and 9.5. The mixture is then boiled for about 3 hours at about 212° F. so that all of the coagulable material is precipitated.

At the conclusion of the heating operation, the mixture containing precipitated solids is passed through a filter to separate the solids and provide a clear solution.

The solution is then substantially neutralized by the addition of hydrochloric acid and is concentrated in a vacuum pan to a paste-like product or dried by any suitable means, such as a spray drier or vacuum roll type drier, and packaged.

The nutrient product produced as indicated above had been found to be an excellent nutrient for growing bacteria, yeast, and molds and gives results comparable with the results obtained with crude corn steep water, thereby showing that the essential growth factors in corn steep water are not destroyed during the processing of the corn steep water. The product, being free from carbohydrates and coagulable materials has the advantage that it can be used in a wide variety of culture media where it is important that the media remaind clear and free from precipitates such as are encountered very often when crude corn steep water is used.

It will be understood that the process is susceptible to considerable modification, for example, in the addition of an acid-hydrolyzing step to convert dextrines into fermentable sugars. Also the pH values and the temperatures and times required in the various steps of the method can be modified considerably, and the types of concentrating and filtering or precipitate-separating equipment used can be varied widely. Therefore, the process described above should be considered illustrative of the invention and not as limiting the scope of the following claims.

We claim:

1. A method of producing a nutrient for microorganisms from corn steep water which comprises concentrating the corn steep water to increase its total solids content, adding yeast to said steep water to ferment carbohydrates present in said steep water, adding an alkali to said steep water to render it strongly alkaline, heating said alkaline steep water to precipitate coagulable solids, separating the precipitated solids from the liquid components, and susbtantially neutralizing said liquid components.

2. A method of producing a nutrient for microorganisms from corn steep water which comprises concentrating the corn steep water to about 10% total solids content, adding yeast to said steep water to ferment carbohydrates present in said steep water, adding an alkali to said steep water to render it strongly alkaline, heating said alkaline steep water to precipitate coagulable solids, separating the precipitated solids from the liquid components, and substantially neutralizing said liquid components.

3. A method of producing a nutrient for microorganisms from corn steep water which comprises concentrating the corn steep water to increase its total solids content, adding yeast to said steep water to ferment carbohydrates present in said steep water, aerating the yeast-containing steep water, adding an alkaline compound to the fermented steep water to render it strongly alkaline, heating said alkaline steep water to precipitate coagulable solids, separating the precipitated solids from the liquid components, and substantially neutralizing said liquid components.

4. A method of producing a nutrient for microorganisms from corn steep water which comprises concentrating the corn steep water to increase its total solids content, adding yeast to said steep water to ferment carbohydrates present in said steep water, adding an alkali to said steep water to adjust its pH value to between about 8.5 and 9.5, heating said alkaline steep water to precipitate coagulable solids, separating the precipitated solids from the liquid components, and substantially neutralizing said liquid components.

5. A method of producing a nutrient for microorganisms from corn steep water which comprises concentrating the corn steep water to increase its total solids content, acid-hydrolyzing said steep water, adding yeast to said steep water to ferment carbohydrates, adding an alkali to said steep water to render it strongly alkaline, heating said alkaline steep water to precipitate coagulable solids, separating the precipitated solids from the liquid components, and substantially neutralizing said liquid components.

6. A method of producing a nutrient for microorganisms from corn steep water which comprises concentrating the corn steep water to increase its total solids content, adding yeast to said steep water to ferment carbohydrates present in said steep water, adding an alkali to said steep water to render it strongly alkaline, heating said alkaline steep water to at least 190° F. to precipitate coagulable solids, separating the precipitated solids from the liquid components, and substantially neutralizing said liquid components.

7. A method of producing a nutrient for microorganisms from corn steep water which comprises concentrating the corn steep water to about 10% total solids content, adding yeast to said steep water to ferment carbohydrates present in said steep water, aerating the yeast-containing steep water, adding an alkaline reagent to said fermented steep water to render it strongly alkaline, heating said alkaline steep water to precipitate coagulable solids, separating the precipitated solids from the liquid components, and substantially neutralizing said liquid components.

8. A method of producing a nutrient for microorganisms from corn steep water which comprises concentrating the corn steep water to about 10% total solids content, adding yeast to said steep water to ferment carbohydrates present in said steep water, aerating the yeast-containing steep water, adding an alkaline reagent to said fermented steep water to adjust its pH value to between about 8.5 and 9.5, heating said alkaline steep water to at least 190° F. to precipitate coagulable solids, separating the precipitated solids from the liquid components, and substantially neutralizing said liquid components.

9. A method of producing a nutrient for microorganisms from corn steep water which comprises concentrating the corn steep water to about 10% total solids content, acid-hydrolyzing said steep water, adding yeast to said hydrolyzed steep water, aerating the yeast-containing steep water, adding an alkaline reagent to said yeast-containing steep water to adjust its pH value to between about 8.5 and 9.5, heating said alkaline steep water to at least 190° F. to precipitate coagulable solids, separating any precipitated solids from the liquid components, and substantially neutralizing said liquid components.

ROBERT P. MYERS.
MARVIN L. SPECK.

REFERENCES CITED

The following references are of record in the file of this patent:

UNITED STATES PATENTS

| Number | Name | Date |
| --- | --- | --- |
| 423,213 | Brunn | Mar. 11, 1890 |
| 914,379 | Behr | Mar. 9, 1909 |
| 1,005,456 | Nussbaum | Oct. 10, 1911 |
| 1,174,248 | Frerichs | Mar. 7, 1916 |
| 1,528,469 | Davidson | Mar. 3, 1925 |
| 1,642,537 | Brown | Sept. 13, 1927 |
| 1,918,812 | Kerr | July 18, 1933 |
| 2,067,002 | Pollak | Jan. 5, 1937 |
| 2,179,203 | Stein | Nov. 7, 1939 |
| 2,190,644 | Rawling | Feb. 20, 1940 |
| 2,298,623 | Jurgensen | Oct. 13, 1942 |
| 2,302,393 | Schopmeyer | Nov. 17, 1942 |
| 2,305,940 | Walsh | Dec. 22, 1942 |

OTHER REFERENCES

Coghill, Monthly Progress Report No. 3, May 2, 1942, page 2. Distributed by Committee on Medical Research, O. S. R. D.

Kennedy, "Corn Steep Water as Nutrient for Penicillin." Paper presented as Penicillin Technical Meeting, Jan. 21 and 22, 1944, New York, N. Y., pages 1 to 4.

---

Certificate of Correction

Patent No. 2,448,680.   September 7, 1948.

ROBERT P. MYERS ET AL.

It is hereby certified that errors appear in the printed specification of the above numbered patent requiring correction as follows: Column 4, line 4, for the word "had" read has; line 14, for "remaind" read remain; and that the said Letters Patent should be read with these corrections therein that the same may conform to the record of the case in the Patent Office.

Signed and sealed this 16th day of November, A. D. 1948.

[SEAL]

THOMAS F. MURPHY,
Assistant Commissioner of Patents.

5. A method of producing a nutrient for microorganisms from corn steep water which comprises concentrating the corn steep water to increase its total solids content, acid-hydrolyzing said steep water, adding yeast to said steep water to ferment carbohydrates, adding an alkali to said steep water to render it strongly alkaline, heating said alkaline steep water to precipitate coagulable solids, separating the precipitated solids from the liquid components, and substantially neutralizing said liquid components.

6. A method of producing a nutrient for microorganisms from corn steep water which comprises concentrating the corn steep water to increase its total solids content, adding yeast to said steep water to ferment carbohydrates present in said steep water, adding an alkali to said steep water to render it strongly alkaline, heating said alkaline steep water to at least 190° F. to precipitate coagulable solids, separating the precipitated solids from the liquid components, and substantially neutralizing said liquid components.

7. A method of producing a nutrient for microorganisms from corn steep water which comprises concentrating the corn steep water to about 10% total solids content, adding yeast to said steep water to ferment carbohydrates present in said steep water, aerating the yeast-containing steep water, adding an alkaline reagent to said fermented steep water to render it strongly alkaline, heating said alkaline steep water to precipitate coagulable solids, separating the precipitated solids from the liquid components, and substantially neutralizing said liquid components.

8. A method of producing a nutrient for microorganisms from corn steep water which comprises concentrating the corn steep water to about 10% total solids content, adding yeast to said steep water to ferment carbohydrates present in said steep water, aerating the yeast-containing steep water, adding an alkaline reagent to said fermented steep water to adjust its pH value to between about 8.5 and 9.5, heating said alkaline steep water to at least 190° F. to precipitate coagulable solids, separating the precipitated solids from the liquid components, and substantially neutralizing said liquid components.

9. A method of producing a nutrient for microorganisms from corn steep water which comprises concentrating the corn steep water to about 10% total solids content, acid-hydrolyzing said steep water, adding yeast to said hydrolyzed steep water, aerating the yeast-containing steep water, adding an alkaline reagent to said yeast-containing steep water to adjust its pH value to between about 8.5 and 9.5, heating said alkaline steep water to at least 190° F. to precipitate coagulable solids, separating any precipitated solids from the liquid components, and substantially neutralizing said liquid components.

ROBERT P. MYERS.
MARVIN L. SPECK.

REFERENCES CITED

The following references are of record in the file of this patent:

UNITED STATES PATENTS

| Number | Name | Date |
|---|---|---|
| 423,213 | Brunn | Mar. 11, 1890 |
| 914,379 | Behr | Mar. 9, 1909 |
| 1,005,456 | Nussbaum | Oct. 10, 1911 |
| 1,174,248 | Frerichs | Mar. 7, 1916 |
| 1,528,469 | Davidson | Mar. 3, 1925 |
| 1,642,537 | Brown | Sept. 13, 1927 |
| 1,918,812 | Kerr | July 18, 1933 |
| 2,067,002 | Pollak | Jan. 5, 1937 |
| 2,179,203 | Stein | Nov. 7, 1939 |
| 2,190,644 | Rawling | Feb. 20, 1940 |
| 2,298,623 | Jurgensen | Oct. 13, 1942 |
| 2,302,393 | Schopmeyer | Nov. 17, 1942 |
| 2,305,940 | Walsh | Dec. 22, 1942 |

OTHER REFERENCES

Coghill, Monthly Progress Report No. 3, May 2, 1942, page 2. Distributed by Committee on Medical Research, O. S. R. D.

Kennedy, "Corn Steep Water as Nutrient for Penicillin." Paper presented as Penicillin Technical Meeting, Jan. 21 and 22, 1944, New York, N. Y., pages 1 to 4.

---

Certificate of Correction

Patent No. 2,448,680.

September 7, 1948.

ROBERT P. MYERS ET AL.

It is hereby certified that errors appear in the printed specification of the above numbered patent requiring correction as follows: Column 4, line 4, for the word "had" read *has*; line 14, for "remaind" read *remain*; and that the said Letters Patent should be read with these corrections therein that the same may conform to the record of the case in the Patent Office.

Signed and sealed this 16th day of November, A. D. 1948.

[SEAL]

THOMAS F. MURPHY,
*Assistant Commissioner of Patents.*